Oct. 25, 1960  R. S. EVANS  2,957,593
DROP FRAME TRAILER
Filed Feb. 15, 1957  2 Sheets-Sheet 1
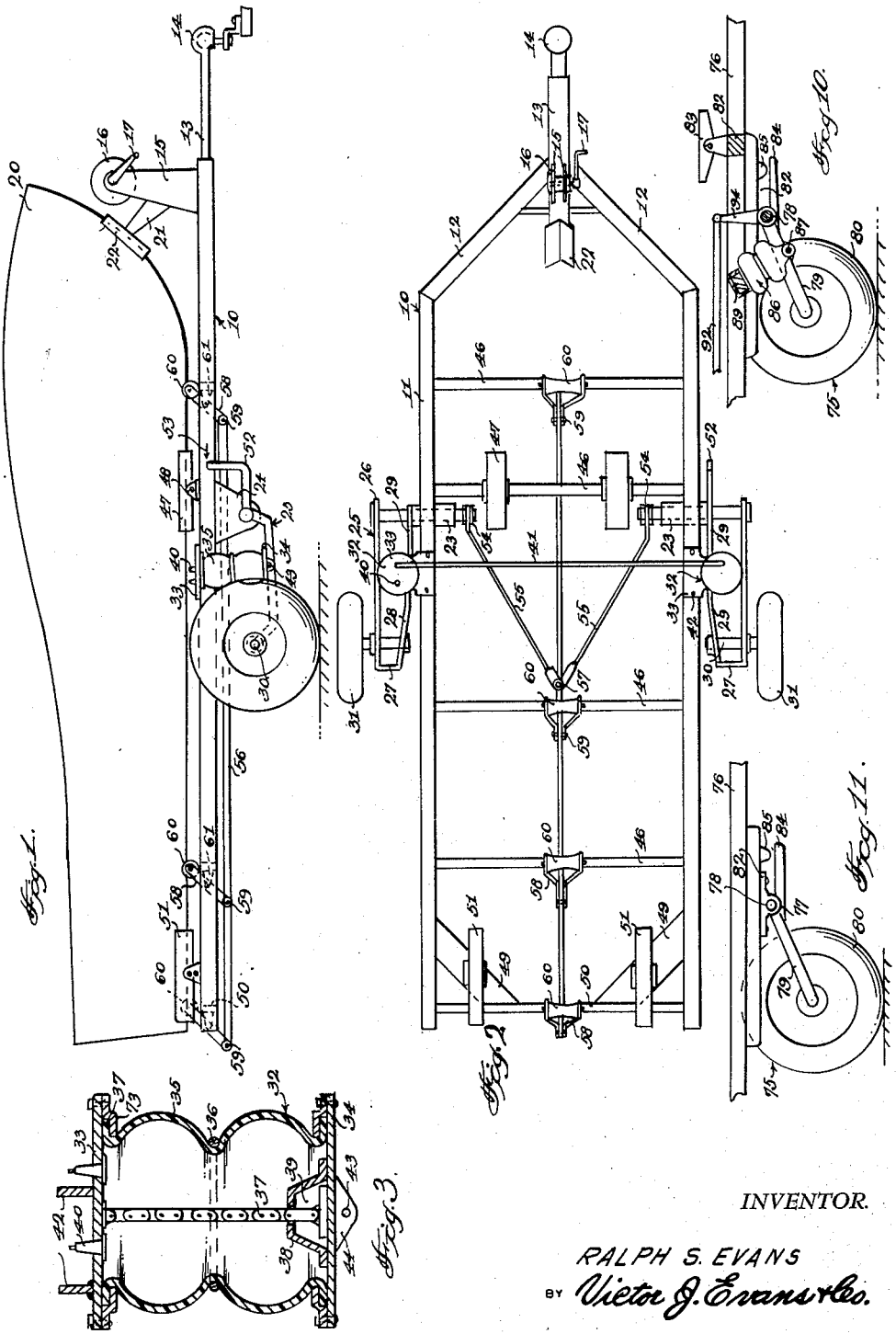
INVENTOR.
RALPH S. EVANS
BY *Victor J. Evans & Co.*
ATTORNEYS Oct. 25, 1960 R. S. EVANS 2,957,593
DROP FRAME TRAILER
Filed Feb. 15, 1957 2 Sheets-Sheet 2
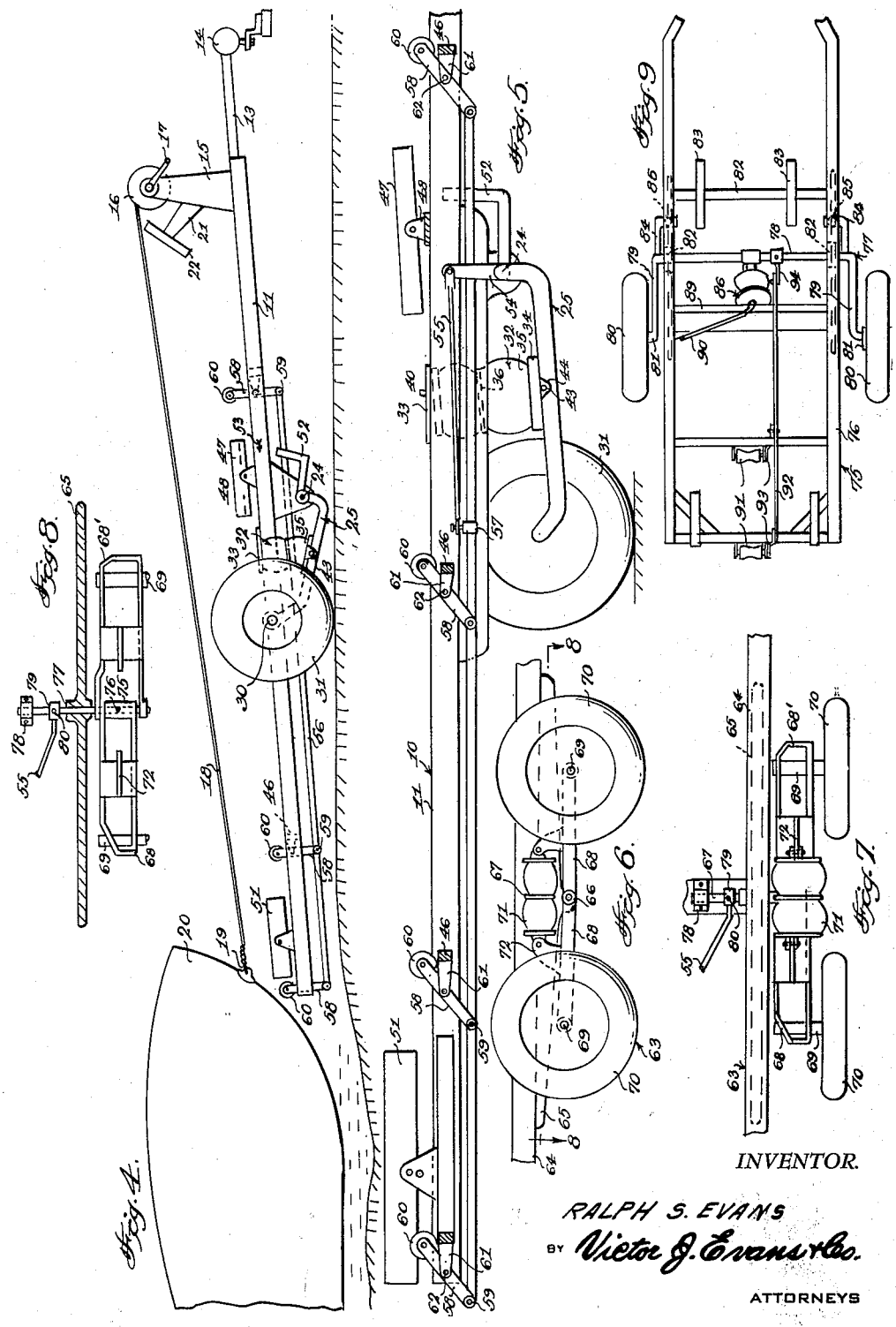
INVENTOR.
RALPH S. EVANS
BY Victor J. Evans & Co.
ATTORNEYS

United States Patent Office 2,957,593
Patented Oct. 25, 1960

2,957,593
DROP FRAME TRAILER
Ralph S. Evans, 730 NE. 90th St., Miami, Fla.

Filed Feb. 15, 1957, Ser. No. 640,455

5 Claims. (Cl. 214—506)

This invention relates to a trailer, and more particularly to a trailer for handling boats.

This invention is an improvement over the drop frame boat trailer shown and described in my co-pending application Serial No. 537,639, filed September 30, 1955, now Patent No. 2,774,612.

The object of the invention is to provide a boat trailer which includes a means for raising and lowering the frame of the trailer so as to facilitate the loading or unloading of a boat from the trailer.

Another object of the invention is to provide a boat trailer which includes a frame that can be adjusted by means of a plurality of casings that are adapted to be expanded or contracted by air pressure or the like, so that replacement or removal of a boat from the trailer can be readily simplified or facilitated.

A further object of the invention is to provide a drop frame boat trailer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing a boat mounted on the trailer of the present invention.

Figure 2 is a top plan view of the trailer.

Figure 3 is a vertical sectional view taken through one of the inflatable casings.

Figure 4 is a side elevational view showing the frame in lowered position as when the casings are deflated, and with the boat off of the trailer.

Figure 5 is a side elevational view showing the frame in raised position as when the casings are inflated.

Figure 6 is a fragmentary side elevational view illustrating a modification.

Figure 7 is a plan view of the modification shown in Figure 6.

Figure 8 is a sectional view taken on the line 8—8 of Figure 6.

Figure 9 is a fragmentary plan view illustrating a further modification.

Figures 10 and 11 are fragmentary sectional views showing the modification of Figure 9.

Referring in detail to the drawings, and more particularly to Figures 1 to 5 inclusive of the drawings, there is shown a trailer which includes a frame that is indicated generally by the numeral 10, and the frame includes a pair of spaced parallel beams 11, Figure 2. Extending forwardly from the front end of each beam 11 and secured thereto or formed integral therewith is an angularly arranged member 12, and the members 12 are secured to a drawbar 13 in any suitable manner. A hitch 14 is arranged on the front end of the drawbar 13, whereby the trailer can be readily attached to a towing vehicle such as an automobile.

Extending upwardly from the drawbar 13 and secured thereto and supported thereby, is a supporting structure which includes a pair of spaced parallel vertically disposed plates 15. The plates 15 support a winch 16, and the winch 16 may be operated by means of a hand crank 17. A cable 18 is trained over the winch 16, and the cable 18 is provided with a hook 19 for engagement with a portion of a boat 20 which is being handled, Figure 4. Extending rearwardly and upwardly from the plate 15 and secured thereto, is an inclined brace 21, and secured to the upper end of the brace 21 is an inclined support member or cradle 22 which is adapted to engage a portion of the boat 20 so as to help steady the boat when the boat is being carried or transported.

Secured to each of the beams 11 of the frame of the trailer is a bearing 23, and rotatably supported by each bearing 23 is a shaft 24, Figure 2. A bracket 25 is secured to each shaft 24, and each bracket 25 includes a first portion 26 which is secured to the shaft 24 in any suitable manner. Each bracket 25 further includes a second portion 27 which is arranged at right angles with respect to the first portion 26, and extending forwardly from the portion 27 is a third portion 28 which is arranged angularly with respect to the portion 27. Extending forwardly from the third portion 28 is a fourth portion 29, and the fourth portion 29 is also secured to the shaft 24. Thus, as the shafts 24 move, the brackets 25 move therewith. Connected to the portions 26 and 28 of each bracket 25 is an axle 30, and the axles 30 have ground engaging wheels 31 connected thereto.

Arranged adjacent the outer surface of each of the beams 11 is a casing 32, Figure 3. Each casing 32 includes upper and lower plates or walls 33 and 34, and each casing further includes an inflatable flexible body portion 35 that can be made of any suitable expansible material. A ring 36 surrounds the intermediate portion of the casing 32 so as to maintain the casing in its proper position. A connecting member 37 extends between the top and bottom of each casing, and the connecting member 37 may be in the nature of a chain which serves to insure that the ends of the casing will not expand too far. A base 38 is arranged in each casing, and a coil spring 39 is positioned within the base 38, the coil spring 39 acting as a shock absorber. Extending upwardly from the top plate 33 of each casing are valves 40 which can be used for controlling the admission or flow of air or other gaseous medium into and out of the inflatable casings. A conduit 41 extends between the pair of casings 32 as shown in Figure 2, whereby it is only necessary to inflate or deflate one of the casings so as to cause both casings to move or operate in unison.

The upper ends of the casings 32 are secured to the beams 11 by means of braces or ribs 42, and ears 44 depend from the lower ends of the casings. Suitable securing elements such as bolts 43 extend through the ears 44 and these bolts 43 are connected to the portions 26 and 29 of the brackets 25.

Extending between the pair of beams 11 and secured thereto in any suitable manner, as for example by means of suitable securing elements, or by means of welding, is a plurality of spaced parallel crosspieces 46. Cradles 47 are supported above certain of the crosspieces 46 by means of arms or upright members 48, and these cradles 47 are adapted to engage lower portions of the boat so as to help steady the boat which is being handled. Other cradles 51 are adapted to engage the rear of the boat 20, and the cradles 51 may be supported above braces 49, the braces 49 extending between the rear crosspiece 50 and the beams 11, Figure 2. Extending forwardly from one of the shafts 24 is an L-shaped arm or pointer 52, Figures 2 and 4, and the pointer 52 is adapted to co-act with a mark or indicia 53 which is arranged on the outer surface of the adjacent beam 11, whereby the co-acting arm 52 and marking 53 can be used to indicate to a person the position of the adjustable parts.

Extending upwardly from the inner end of each shaft 24 is an upstanding leg 54, and a pair of angularly arranged rods 55 have their front ends connected to the upper ends of the legs 54. The rear ends of the rods 55 converge and are connected to a shiftable bar 56 by means of a clamp 57, Figure 5. There is further provided levers 58 which are arranged in pairs, and the lower ends of the levers 58 are pivotally connected to the bar 56 by means of a bolt or pivot pin 59. A roller 60 is journaled between each pair of levers 58, and the rollers 60 are adapted to engage the lower surface of the boat 20 whereby the boat can be more easily rolled onto or off of the trailer. Pairs of links 61 extend from each pair of levers 58, and the links 61 are pivotally connected to the levers 58 by means of pivot pins 62, the other ends of the links 61 being connected to the adjacent crosspieces 46.

Referring to Figures 6, 7 and 8 of the drawings, there is shown a portion of a modified trailer which is indicated generally by the numeral 63, and the boat trailer 63 includes side beams 64 which each have a support member 65 secured therebelow, and each support member 65 may be provided with an enlarged depending intermediate portion 66. A shaft 67 extends through the depending portion 66, and sections 68 and 68' are connected to the shaft 67. The supporting section 68 includes a collar 75 which is mounted on the shaft 67, and a pin or key 76 extends through the collar 75 and into engagement with the shaft 67. The supporting section 68' is freely mounted on the shaft 67. The shaft 67 is arranged so that it extends through a bearing 77 in the support member 65, and the bearing 78 is also arranged in engagement with the shaft 67. Rods 55 have collars 79 which are secured to the shaft 67 through the medium of a pin or key 80. An axle 69 is carried by each supporting section 68 and 68', and ground engaging wheels 70 are connected to the axles 69. An inflatable or expansible casing 71 is provided for each pair of wheels 70, and the ends of the casings 71 are connected to the movable sections 68 by means of ears or links 72. The casings 71 may be inflated by a suitable source of air or the like which can be supplied by any suitable mechanism, and while only a portion of the apparatus has been illustrated in Figures 6, 7 and 8, it is to be understood that a similar arrangement is provided on the other side of the trailer.

From the foregoing, it is apparent that there has been provided a drop frame boat trailer which is an improvement over the boat trailer shown and described in my prior application, Serial No. 537,639. In using the trailer of the present invention, as previously described the frame 10 can be raised or lowered, depending upon whether the boat such as the boat 20 is being transported or whether it is being loaded or unloaded. When the boat 20 is being transported by the trailer, the parts are in the position shown in Figure 1 and the hitch 14 can be connected to a suitable towing vehicle such as an automobile. Thus, the trailer can readily be used for moving the boat 20 to any desired location, and when the boat is being transported, the boat rests on the member 22 and on the cradles 47 and 51. When the boat 20 is being transported or carried or moved, as for example when the parts are in the position shown in Figure 1, the pair of casings 32 are in inflated position, and these casings are inflated or expanded by means of air which can be introduced into the interior of the casings 32 through the valves 40. The casings 32 can be made of a suitable material such as cloth or the like. The upper end of each casing 32 is secured to a complementary beam 11, while the lower end of each casing is connected to the bracket 25. The pair of casings 32 are interconnected together by means of the conduit or line 41 so that by filling one of the casings or emptying one of the casings, the other casing will be likewise filled or emptied.

After the boat has been moved to the desired location, as for example when the boat is to be launched in the water as shown in Figure 4 or removed from the water, the winch 16 is actuated by means of the crank 17. Thus, assuming that the boat 20 is in the water as shown in Figure 4, the hook 19 of the cable 18 can be arranged in engagement with a suitable portion of the boat 20 and then the winch 16 can be rotated by means of the crank 17 so as to pull the boat 20 up onto the trailer. When the boat 20 is being pulled onto the trailer or removed therefrom, the casings 32 are in deflated position and this results in the rollers 60 moving from the lowered position shown in Figure 1 to the raised position shown in Figure 4 whereby the boat 20 can easily roll onto or off of the trailer. This swinging movement of the rollers 60 to raised or lowered poition is accomplished automatically as the casings 32 are inflated or deflated. After the boat 20 has been pulled onto the trailer from the position shown in Figure 4 to the position shown in Figure 1, the casings 32 are inflated by any suitable means, as for example by means of an air pump whereby the frame 10 will move from the lowered position of Figure 4 to the raised position of Figure 1 so that the rollers 60 will swing downwardly whereby the boat 20 will be supported on the members 22 and cradles 47 and 51.

Thus, it will be seen that when the boat is being transported, the casings 32 are inflated, and the rollers 30 are in down position. Similarly, when the boat is being loaded or unloaded from the trailer, the casings 32 are in deflated position, and the rollers 60 are in raised position.

The automatic movement of the rollers 60 is brought about by inflation or deflation of the casings 32 due to the following construction. When the casings 32 are deflated as shown in Figure 4, the brackets 25 are in the position shown in Figure 4. Then, when the casings 32 are inflated, the brackets 25 and frame 10 will move away from each other due to the expanding casings 32 since the brackets 25 are welded on the shafts 24. As the brackets 25 are pivoted on the shafts 24 which pivot in the bearings 23 due to the expanding bellows or casing 32 this will cause the legs 54 to move and since the rods 55 are connected to the upper ends of the legs 54, then this inflation of the casings will cause movement of the rods 55. The rear ends of the rods 55 are connected to the shiftable or movable bar 56 by means of the clamp 57, so that this movement of the rods 55 causes the bar 56 to be shifted. As the bar 56 shifts, it causes pivotal movement of the levers 58 and the levers 58 are connected to the bar 56 by means of the pin 59. The levers 58 are also pivotally connected to the links 61 by means of the pins 62, so that this movement of the bar 56 results in swinging movement of the levers 58 which in turn results in movement of the rollers 60. Thus, when the casings 32 are in deflated position as when the boat is being moved onto or off of the trailer, the rollers 60 are up so as to permit the boat to be readily rolled onto or off of the trailer. However, when the boat is being transported, the rollers 60 are not being used so that the rollers are automatically moved to the lowered position due to the inflating of the casings 32.

In the modification shown in Figures 6, 7 and 8, the casings 71 have a construction and function which is somewhat similar to the previously described casings 32, except that the casings 71 are arranged in a horizontal position instead of a vertical position. By inflating or deflating casings 71, it will be seen that the trailer frame can be raised or lowered by means of the inflatable casings 71 so that the frame can be arranged in the different position depending upon whether the boat is being transported or loaded or unloaded.

As shown in Figure 3, end portions of the casings 32 can be secured to the plate 33 and 34 by means of clamping rings 73. The braces 42 serve to connect the upper ends of the casings to the beams 11, while the lower ends of the casings are connected to the brackets 25. The various cradles can be arranged so that they are adjustable and tiltable, and the parts can be made of any suitable material and in any desired shape or size. As previously described, the rollers are raised automatically when the trailer is lowered. The marking 53 on the frame 10 is adapted for co-action with the arm 52 so that the user can ascertain when the frame has been raised to the desired position. By letting the air out of the casings, the frame will move to the lowered position. The casings act as air springs. The portions 35 of the casings 32 may be made of a rubber covered fabric, and the spring 39 acts as a shock absorber. Instead of filling the casings 32 with air, these casings can be filled with any other gaseous medium such as an inert gas as for example carbon dioxide.

Thus, it will be seen that there has been provided a drop frame trailer which includes adjustable load springs or casings and the casings insure that the load such as the boat can be transported smoothly. If desired, a surge tank can be connected into the air line to permit greater flexibility of the casings on the trailer. The compressed air or the inert gas can be carried in a suitable container or if desired, a small compressor may be arranged on the trailer or adjacent to the trailer for filling the casings when desired. Furthermore, a hand pump can be used for filling the casings.

In the tandem arrangement shown in Figures 6, 7 and 8, the air springs may be connected together by a flexible air line, and as previously described, the bracket 68 may be secured in any suitable manner as for example by welding to the shaft 67, or the bracket 68' can pivot on the shaft 67. When the air springs or casings are deflated, the rod 55 will be moved so as to raise the rollers. The casings also act as springs to absorb road shock.

If desired, as a modification or alternative construction, a single air spring may be used instead of a plurality of the air springs or casings.

Referring to Figures 9, 10 and 11 of the drawings, there is shown a modified trailer which is indicated generally by the numeral 75, and the trailer 75 includes a frame 76, there being an axle which is indicated generally by the numeral 77. The axle 77 includes a first portion 78 which extends transversely with respect to the longitudinal axis of the frame, and extending angularly from the first portion 78 are second portions 79 which terminate in third portions 81, there being ground engaging wheels 80 mounted on the portions 81.

Supported by the frame 76 is a cross piece 82, and supported by the cross piece 82 are cradles 83.

Extending forwardly from the axle 77 and secured thereto, is a pair of spaced apart arms 84, and the arms 84 are mounted for movement into and out of engagement with resilient or rubber shock absorbers or bumpers 85, Figure 10. The trailer 75 includes a single air spring or expansible casing 86 which is connected to a link 88 by means of a pin 87, and the link 88 is secured to the axle 77. The casing 86 has its upper end secured to a cross piece 89 which is secured to the frame 76. A conduit 90 leads to the casing 86, and the conduit 90 may have a suitable valve arranged therein.

Movement of the axle 77 results in movement of the plurality of rollers 91, in much the same manner as previously described. Thus, the rollers 91 each are provided with a lever 93 which is connected to a rod 92, and the rod 92 has its front end connected to a link 94 which extends upwardly from the axle 77.

Thus, in Figures 9, 10 and 11, it will be seen that there has been provided a modified trailer which is indicated generally by the numeral 75, and the trailer 75 includes the single spring or casing 86, rather than a plurality of springs or casings. As the casing 86 is actuated, the rollers 91 can be moved, in the same manner as previously described, due to the provisions of the movable rod 92 and its associated parts. The arms 84 are adapted to engage the rubber bumpers 85 so as to provide shock absorbers.

The arms 84 may be secured as by welding to the axle 77, and the shock absorbers 85 may be made of any suitable material such as rubber. The shock absorbers shown in Figures 9, 10 and 11 can be used instead of the chain arrangement 37 shown in Figure 3. The wheels 80 are mounted on the ends of the axles 77, and the axle 77 is clamped to the frame 76 by means of the clamps or bearings 82.

I claim:

1. In a boat trailer, a frame including a pair of spaced parallel beams, angularly arranged members extending forwardly from the front ends of said beams, a drawbar extending forwardly from said angularly arranged members, a hitch on the front end of said drawbar, vertically disposed plates extending upwardly from said drawbar, a manually operable winch supported by said plates, a cable trained over said winch and having a hook connected thereto, an inclined brace extending rearwardly from said plates, an inclined support member secured to said brace for engagement with a portion of a boat, a bearing secured to each of said beams intermediate to the ends thereof, a horizontally disposed shaft carried by each bearing, a bracket mounted on each shaft, an axle connected to each bracket and supported thereby, a ground engaging wheel mounted on each axle, a pair of inflatable casings arranged adjacent to the surface of said beams, a conduit connecting said pair of casings together, each of said casings including a flexible body portion and upper and lower plates, said upper plates being secured to said beams, and said lower plates being connected to said brackets, a plurality of crosspieces extending between said beams and secured thereto, cradle supports secured to one of said cross pieces and extending thereabove, cradles pivotally mounted on said cradle supports for engagement with the lower portion of a boat, a leg extending upwardly from the inner end of each of said shafts, a rearwardly extending rod connected to the upper end of each leg, a shiftable bar extending parallel to the longitudinal axis of said frame, a clamp connecting the rear ends of said rods to said bar, levers arranged in pairs and extending upwardly from said bar and pivotally connected thereto, a roller connected to each pair of levers, and links extending between said crosspieces and lever and connected thereto.

2. The structure as defined in claim 1, and further including valves for controlling the flow of a gaseous medium into and out of said casings.

3. In a boat trailer, a frame including a pair of spaced parallel beams, angularly arranged members extending forwardly from the front ends of said beams, a drawbar extending forwardly from said angularly arranged members, a hitch on the front end of said drawbar, vertically disposed plates extending upwardly from said drawbar, a manually operable winch supported by said plates, a cable trained over said winch and having a hook connected thereto, an inclined brace extending rearwardly from said plates, an inclined support member secured to said brace for engagement with a portion of a boat, a bearing secured to each of said beams intermediate the ends thereof, a horizontally disposed shaft carried by each bearing, a bracket mounted on each shaft, an axle connected to each bracket and supported thereby, a ground engaging wheel mounted on each axle, a pair of inflatable casings arranged adjacent to the surface of said beams, a conduit connecting said pair of casings together, each of said casings including a flexible body portion and upper and lower plates, said upper plates being secured to said beams, and said lower plates being connected to said brackets, a plurality of crosspieces extending between said beams and secured thereto, cradle supports secured to one of said cross pieces and extending thereabove, cradles pivotally mounted on said cradle supports for engagement with the lower portion of a boat, a leg extending upwardly from the inner end of each of said shafts, a rearwardly extending rod connected to the upper end of each leg, a shiftable bar extending parallel to the longitudinal axis of said frame, a clamp connecting the rear ends of said rods to said bar, levers arranged in pairs and extending upwardly from said bar and pivotally connected thereto, a roller connected to each pair of levers, and links extending between said crosspieces and lever and connected thereto, valves for controlling the flow of a gaseous medium into and out of said casings, an arm connected to one of said axles, and an indicating mark on one of said beams for coaction with said arm.

4. In a drop frame trailer, an elongated frame having a pair of spaced beams, a bearing secured to each of said beams intermediate the ends thereof, substantially horizontally disposed shaft means positioned in each of said bearings, a bracket secured at one end to each of said shaft means adjacent each of said bearings, an axle secured to each bracket adjacent to the other end thereof, a ground engaging wheel mounted on each axle, an inflatable casing arranged adjacent each of said beams and mounted intermediate said ends of said brackets, each of said casings including a flexible body portion and upper and lower plates, said upper plates being secured to said beams, and said lower plates being connected to said brackets.

5. In a drop frame trailer, an elongated frame having a pair of spaced beams, a bearing secured to each of said beams intermediate the ends thereof, substantially horizontally disposed shaft means positioned in each of said bearings, a bracket secured at one end to each of said shaft means adjacent each of said bearings, an axle secured to each bracket adjacent the other end thereof, a ground engaging wheel mounted on each axle, an inflatable casing arranged adjacent each of said beams and mounted intermediate said ends of said brackets, each of said casings including a flexible body portion and upper and lower plates, said upper plates being secured to said beams, said lower plates being connected to said brackets, a conduit connecting said casings for equalizing the pressures therein, valves for controlling the flow of gaseous medium into and out of said casings, an arm connected to one of said shaft means and an indicating mark positioned on one of said beams for coaction with said arm.

References Cited in the file of this patent

UNITED STATES PATENTS

| | | |
|---|---|---|
| 820,707 | Downer | May 15, 1906 |
| 2,210,485 | Hawkins | Aug. 6, 1940 |
| 2,628,118 | Gunnels | Feb. 10, 1953 |
| 2,788,908 | Lynd | Apr. 16, 1957 |